April 23, 1940.     A. E. SPINASSE     2,197,811
MEANS FOR AND METHOD OF REMOVING CRACKS FROM A SHEET OF GLASS BEING DRAWN
Original Filed Jan. 12, 1922     2 Sheets-Sheet 1
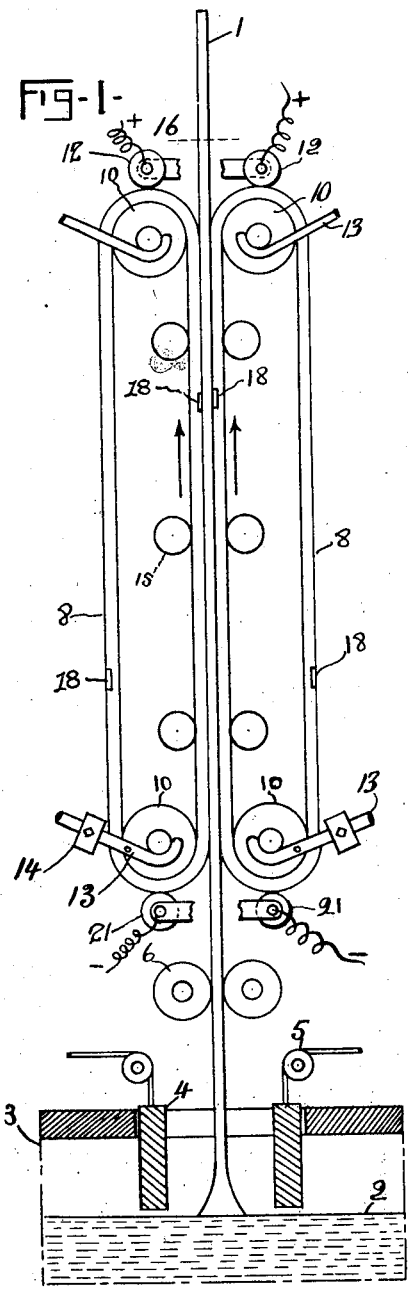
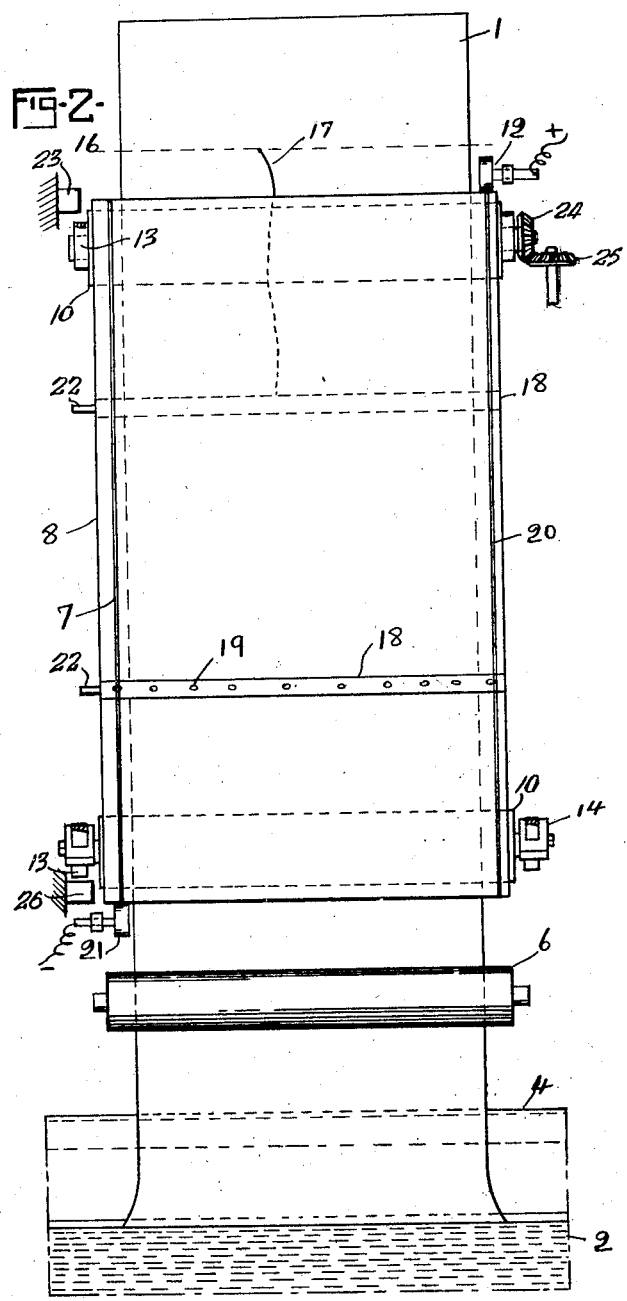
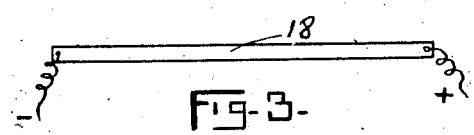
Inventor
Arthur E. Spinasse April 23, 1940. A. E. SPINASSE 2,197,811
MEANS FOR AND METHOD OF REMOVING CRACKS FROM A SHEET OF GLASS BEING DRAWN
Original Filed Jan. 12, 1922   2 Sheets-Sheet 2
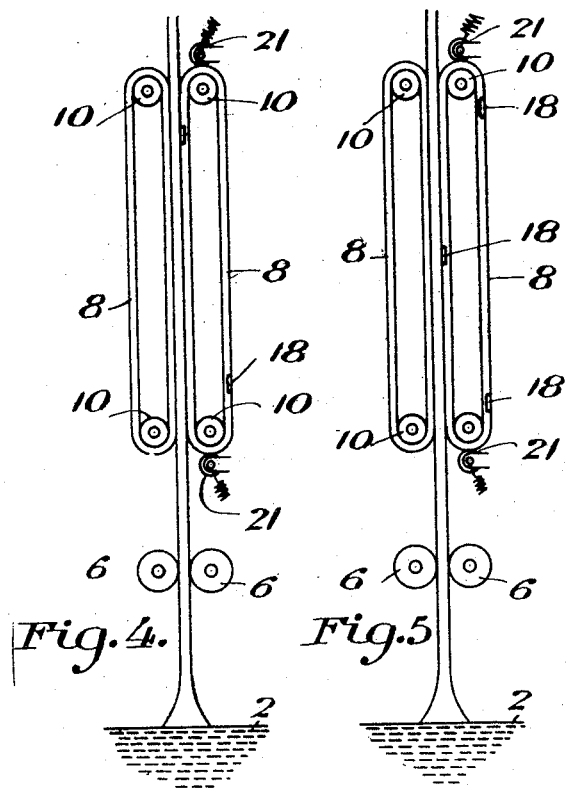

Patented Apr. 23, 1940

2,197,811

UNITED STATES PATENT OFFICE 2,197,811

MEANS FOR AND METHOD OF REMOVING CRACKS FROM A SHEET OF GLASS BEING DRAWN

Arthur E. Spinasse, Mount Vernon, Ohio

Application January 12, 1922, Serial No. 528,766
Renewed October 1, 1935

8 Claims. (Cl. 49—3)

In drawing or forming glass sheets or plates from molten glass, the portion of the sheet which is remote from the molten glass bath is lower in temperature than the portion thereof nearer the point of generation. When the sheet has reached a certain length and has cooled sufficiently, sections of desired length are cut therefrom by means of a suitable cutting tool. At times checks or cracks will be started in the drawn sheet, sometimes during the cutting operation or sometimes due to defects such as refractory particles or stones or the like embedded in the glass and which have a different co-efficient of expansion than that of the glass. These cracks have a great tendency to spread toward the hotter portion of the sheet of glass and consequently move toward the source of generation of the drawn glass sheet. If the sheet is drawn vertically above the glass bath, the crack will move downwardly and as the sheet is drawn it will continuously gain, causing difficulties and serious loss of glass. When the sheet glass is being drawn between pulling or traction rolls, belts or pulleys, the cracks will oftentime spread between these where access is difficult. One embodiment of my invention, which is directed to remove these difficulties and loss of glass, is illustrated in the accompanying drawings, wherein:

Fig. 1 is a side elevation, partly in section.
Fig. 2 is a view taken at right angle to Fig. 1.
Fig. 3 is a modification.
Fig. 4 is a side elevation of a device employing the heating strips on only one of the belts.
Fig. 5 is a similar view showing a greater number of heating strips on the belt than in Fig. 4.

As shown in Figs. 1 and 2 a glass sheet or plate 1 is being drawn from molten glass 2 contained in a receptacle or tank 3. Independent shields 4, 4 are used to prevent excess of heat from the furnace from passing to the drawing area. In raising one shield and lowering the other the temperature may be varied or controlled in the drawing area to obtain the desired viscidity of the glass for drawing which is about 1800° F. (more or less). The desired thickness and degree of flatness can thus be obtained in the sheet glass being drawn, otherwise unequal temperature may cause the sheet to bow or curve on one side, usually on the side of the drawing area which is lower in temperature due to the greater viscidity and surface tension of the glass on that side. However, should the glass be of lower temperature at two distant points on one side of the drawn sheet, the bow side would naturally show on the side of the sheet which is higher in temperature between those points. Local temperature control of the glass bath, on each side transversely of the drawn glass sheet, to obtain uniformity of wall thickness, also causes the sheet to the drawn with uniformity of wall or flatness due to avoidance of differential surface tension in the glass bath at the source of the drawing.

As shown in the figures, the sheet being drawn passes between rolls 6, 6 and passes between a pair of fireproof belts 8, 8 preferably made of asbestos fabric or the like and which move round rolls 10, 10. These rolls 10, 10 are mounted upon, and tend by their weight to slide down, inclined supports 13 to exert yielding tractive pressure upon both faces of the glass sheet or plate being drawn. These rolls may be actuated by suitable gears 24 and 25 driven by a suitable source of power to cause the belts to move in the direction of the arrows. The lower rolls 10, 10 preferably are mounted on pivoted supports 13 provided with counterweight 14 to give the desired tension to the belts 8, 8. Auxiliary pressure rolls 15 may be provided to maintain the belt surfaces flush with the faces of the drawn sheet glass. The belts while preventing too fast cooling of the glass, also cause the sheet to move upwardly where it may be cut transversely at point 16 as it emerges from said traction belts.

Preferably the said belts are provided with means for the prevention of spreading checks or cracks in the drawn sheet glass, said means consisting of or comprising one or more rigid or flexible strips 18, 18 of high electrical resistance, attached at desirable intervals across the face or faces of either or both of the drawing belts which come in contact with the face or faces of the drawn sheet to which the tractive force is applied. These strips which move with the belt or belts may be attached thereto by any suitable means such as rivets 19. I prefer to use these strips 18 on one belt only though not limited thereto. It will be seen that these strips will move automatically, upwardly in contact with the glass, and downwardly when freed from contact with the glass. The ends of the strips are connected by flexible conductors 7 and 20 to a source of electricity whereby the strips may be energized and heated to the desired degree, which may be higher or equal to that of the temperature of the glass at the point of first contact with the glass. It will be seen however, in this case, that the strips engage the glass at a point not far distant from the drawing zone where the glass is yet quite hot. However, a separate automatically operated heating arrangement may be used at a point more remote from the drawing zone if desired.

It will be noted that the belts 8, 8 are wider than the width of the drawn sheet. As shown I prefer to attach the conductors 7 and 20 on the external surface of the margin of the belt that projects beyond the edges of the sheet glass being drawn. In order to maintain a constant electrical current in the strips I provide a positive conducting wheel 12 in constant contact with the moving conductor 20. From this it will be seen that the current passes from wheel 12 to conductor 20 and strips 18 and thence to the negative wheel 21 in constant contact with conductor 7 which contacts with the opposite ends of the strips. Preferably the strips are heated to a temperature slightly higher or equal to the temperature of the drawn sheet when they first come in contact with said sheet, preferably, though not necessarily, to a dark cherry red temperature thus preventing the glass from cooling along the line which is in contact with said heated strip. From this it will be seen that a check or crack spreading downwardly in the sheet as shown by line 17 cannot move very far and will stop at the hot line across the sheet parallel to the heated strip in contact therewith, and which forms part of the pulling belt, preventing the further spreading of the crack until the cutting zone is reached where it may be removed. At times the crack will follow the heated line to one edge of the sheet thus automatically removing the drawback.

In Fig. 3 I show a single strip having terminals and conductors attached to both ends. When required the strip can be placed in contact with the drawn sheet between the lower rolls 10 so that it may be carried in a heated condition between the belts.

When emerging from the belt members, the moving sheet may be cut across its width in any desired commercial lengths by means of any well known method or cutting tools, preferably by clamping at the desired place along the line to cut, a ruler for guiding said cutting tool when used.

The strips may be arranged at regular intervals so that at least one of them will come in engagement with the face of the sheet as or before the one in advance moves out of contact. The present invention also includes a pair of belts or carriers adapted to move with the glass sheet or plate for a period of time, said belts or carriers having electrically heated members extending upon their surfaces and disposed to oppositely engage with the plane surfaces of the sheet glass or plate. Automatically actuated means may be provided for cutting off the current from those strips which are not in contact with the glass.

Such means comprising push button or toggle switches 22—22 arranged for connecting and disconnecting members 18—18 to or from the conductor 7. These switches can be obviously of the well known spring-back type such as will alternately make and break the circuit when actuated in the same direction and are disposed to move with the belts so that when said switches come in contact with the fixed member 26 they will be depressed to turn the electric current into the heater members 18—18 as they are about to engage with the glass sheet 1, and when leaving contact with the glass sheet the said switches will again be depressed by engaging fixed member 23 at the upper end of the belt or belts to thereby cut off the current from said heater members 18—18. Of course, this arrangement may be used in connection with members 18 on both belts.

In the Fig. 4 I have shown the two heating strips 18 only as being applied to one belt 8, the companion belt being entirely free from any such strips.

In Fig. 5 one belt is illustrated as entirely devoid of the heating strips; while the other belt 8 is provided with three such heating strips 18 located at equi-distant points, whereby one of the heating strips is always in contact with the glass which passes between the belts.

It will be clear that modifications may be made in my invention, and I do not desire to be restricted to the specific details in my description except when specific terms are used in the claims.

What I claim as new and desire to secure by Letters Patent, is:

1. A device for arresting cracks in sheet glass during drawing comprising means for heating the glass along a substantially transverse line, and a carrier for said means movable with the glass sheet during drawing and positioned relatively to the glass sheet to bring said heating means into heating relation to the glass sheet substantially at the point where the glass initially becomes set and retain the heating means in said relation to the same area of the glass sheet until adjacent the cutting station where the cracks originate.

2. A device for arresting cracks in sheet glass during drawing comprising means for heating the glass along a substantially transverse line, and a carrier for moving said means when heated into heating relation to the glass sheet substantially at a point where the glass becomes set and for continuing to move said heating means in said relation to the glass sheet until adjacent the cutting station where the cracks originate.

3. A device for arresting cracks in sheet glass during drawing comprising a carrier, and heating means movable with the carrier and glass sheet and constantly maintained by said carrier while said heating means is in heated condition in heating relation to a transverse area of the glass sheet between the cutting zone and the point where the glass sheet becomes set.

4. A device for arresting cracks in sheet glass during drawing comprising an endless carrier, and a plurality of heated strips movable with the carrier and glass sheet and so positioned relatively to one another that at least one of the strips in the heated condition is always maintained by the carrier in heating relation to a transversely extending zone of the sheet between the cutting station and the source from which the sheet is drawn.

5. The method of arresting cracks in sheet glass during drawing which consists in heating the glass sheet during and between cutting operations along a substantially transverse line at a point between the cutting station and the source of glass from which the sheet is drawn.

6. The method of arresting cracks in sheet glass during drawing which consists in applying heat to the glass sheet along a given substantially transverse line from a point where the glass in the sheet initially becomes set and is subject to cracks to a zone adjacent the cutting station where the cracks originate.

7. In apparatus for drawing sheet glass, a non-nicking flat strip, means for passing an electric current through said strip for heating the strip, and a mechanically operated carrier means for maintaining said electrically heated strip with the flat side thereof in contact with the surface of the drawn sheet while the sheet is being cut to intercept a longitudinally extending crack in the sheet.

8. The method of preventing longitudinal checks from a continuously drawn sheet of glass, which consists in applying a heated element to the moving sheet after it rises from the bath and moves toward the cutting station, applying a second heated element spaced below the first heated element before such first heated element is removed from the glass sheet, and applying heated elements to the glass sheet in the same manner continuously.

ARTHUR E. SPINASSE.